INVENTORS
Richard C. Rike &
BY Burlin B. Brombaugh
C. L. Eagle
ATTORNEY

United States Patent Office 3,553,642
Patented Jan. 5, 1971

3,553,642
ELECTRICAL BRAKE LINING WEAR INDICATOR
Richard C. Rike, Dayton, and Burlin B. Brombaugh, Germantown, Ohio, assignors to General Motors Corporation, Detroit, Mich., a corporation of Delaware
Filed July 19, 1968, Ser. No. 746,128
Int. Cl. B60q 1/44
U.S. Cl. 340—52                    3 Claims

ABSTRACT OF THE DISCLOSURE

A brake lining wear indicating apparatus of the type including an electrical conductor embedded in a brake lining whereby sufficient brake lining wear completes a circuit to energize a signal when the conductor engages the electrically conductive brake drum. The conductor is embedded in the lining in an angular relationship such that the terminal end of the conductor must move with the lining as the lining and the conductor expand in response to heat generated during application of the brakes. This arrangement assures contact between the conductor and the brake drum surface regardless of the amount of expansion of the brake lining and the conductor or the differences in the coefficients of expansion between the conductor and the brake lining material.

---

This invention relates to a brake lining wear indicating apparatus including an electrical conductor embedded in a brake lining and contacting the brake drum to complete a circuit energizing a signal when the linings are sufficiently worn. More particularly, this invention concerns the securing of the electrical conductor within the brake lining in a manner assuring contact of the conductor with the brake drum to complete the circuit regardless of variances in coefficients of expansion of the brake lining and conductor materials.

It is common in the brake lining wear signalling art to embed an electrically conductive member in the lining so that a circuit energizing a signal is completed when the brake linings have become sufficiently worn. However, a problem existing with these known arrangements is that the brake lining will expand due to heat generated by the lining rubbing against the drum frequently resulting in the lining moving away from the conductor and opening the circuit to the signalling device. This problem mainly results from the differences in coefficients expansion due to the conductor and the lining being composed of unlike materials. It is therefore a purpose of this invention to provide a conductor within a brake lining which will be in continual contact with the brake drum regardless of conductor and brake lining expansion. A further problem existing with known prior art devices is the positively securing of the conductor within the brake lining material. Conductors entering the lining on a substantially radial line are easily pulled from the lining material opening the electrical signalling circuit. Therefore, another purpose of this invention is to provide a securing arrangement wherein the conductor provides a greater adhesion surface so that it is more positively secured within the lining material.

Among the objects of this invention is the provision of an electrical conductor secured to a brake lining so that it moves with the lining during expansion conditions to insure completion of a signal circuit.

Another object of this invention is the provision of an electrical conductor within the lining material which presents a greater adhesion area so as to be more positively retained therein.

A further object of this invention includes the provision of an electrical conductor within a brake lining whereby slight rubbing contact with the brake drum when the brakes are not applied does not result in energization of the lining wear signalling circuit.

A still further object of this invention is the connecting of an electrical conductor to a brake lining in a manner compensating for the differences in coefficients of expansion of the respective materials so that the conductor moves with the brake lining when the brakes are applied.

Figure 1:
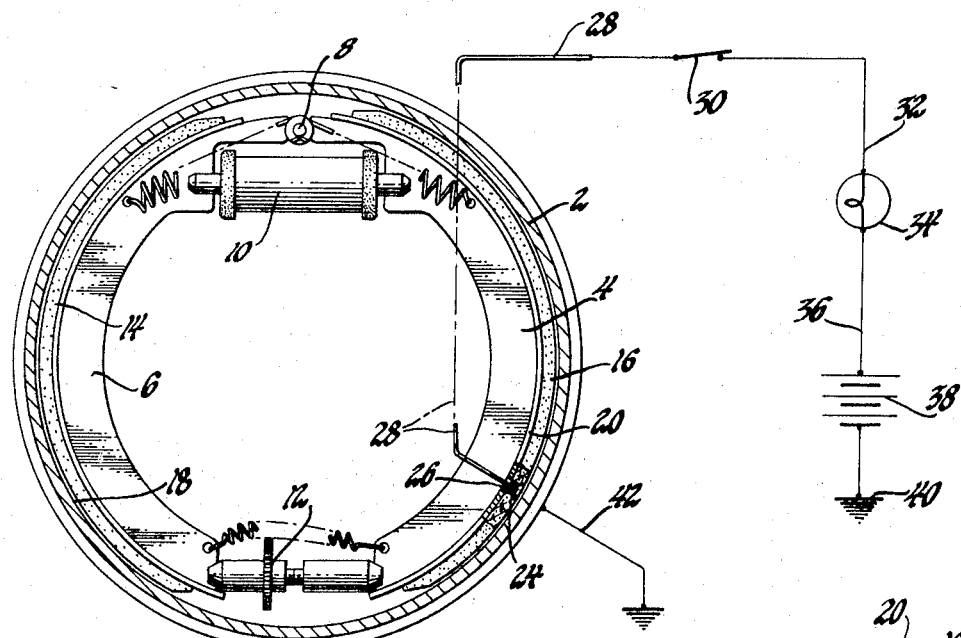
FIG. 1 is an elevational view, partly in section, illustrating a brake drum containing a pair of brake shoes and linings with an electrical conductor being secured within one of the brake linings and connected to a signalling circuit.
Figure 2:
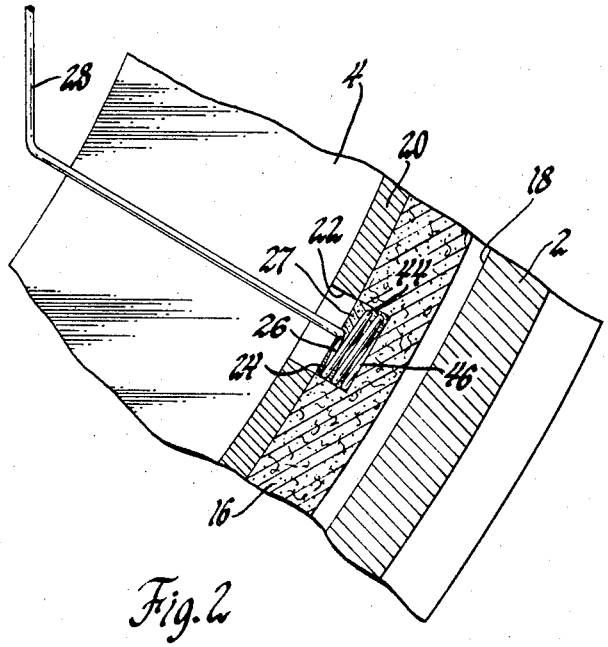
FIG. 2 is a magnified fragmentary view of a portion of the device shown in FIG. 1 illustrating the fastening of the conductor within the brake lining.

Referring now to FIG. 1, a conventional wheel drum 2 is shown having conventional brake shoes 4 and 6 pivotally mounted therein. The brake shoes 4 and 6 are pivotally mounted on pin 8 and actuated by an hydraulic cylinder 10. An automatic adjuster 12 positions the shoes to assure engagement of linings 14 and 16 with the interior surface 18 of wheel drum 2. Brake shoe web 20 contains a drilled aperture 22 which is aligned with a machined recess, cut, or bore 24 in lining 16 as best shown in FIG. 2. The lining recess 24 is machined to a predetermined depth in the lining for a purpose later described. An electrical conductor 26 is placed within the recess 24 and is cemented therein by a resinous adhesive material 27 to retain the conductor in place and simultaneously attach it to the lining material 16. Conductor 26 is connected to a lead wire 28 which is connected to one side of a brake light switch 30 as shown in FIG. 1. The brake light switch is connected by lead 32 to a signal light 34 which in turn is connected by wire 36 to a source 38. The source 38 is connected to ground 40 and brake drum 2 is connected to ground by lead 42.

As illustrated in FIG. 2, the conductor 26 is in the form of a coil spring to provide oblique or angularly extending portions 44 and laterally extending end coil 46 which engages the bottom of recess 24 whereby the filling of the recess 24 with the resinous cement secures the conductor 26 in place. The oblique portions 44 of the spring provide a greater lateral area as compared to a straight or radially extending conductor being fitted within the recess 24. From this arrangement it is obvious that withdrawal of the conductor 26 from the recess 24 is much more difficult because of the increase in lateral area provided by the oblique portions 44.

Figure 3:
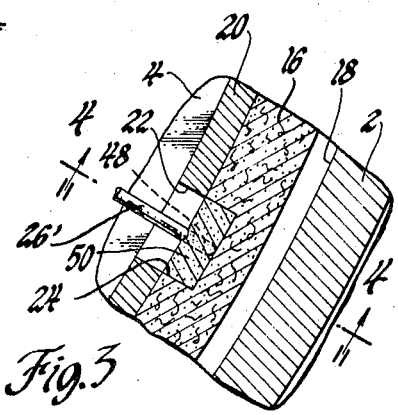
FIG. 3 is also a magnified fragmentary view of a portion of FIG. 1 but showing a modified electrical conductor fastened to the brake lining.
Figure 4:
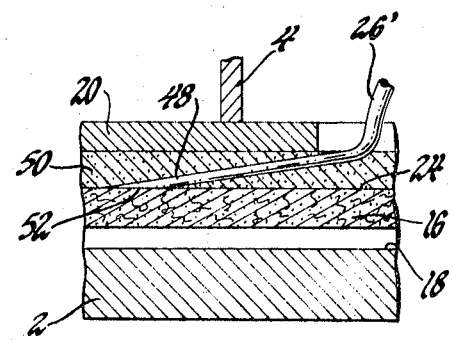
FIG. 4 is a sectional view taken on lines 4—4 of FIG. 3 to more clearly illustrate the modified form of the electrical conductor.

A modification of the electrical conductor 26 is shown in FIG. 3 wherein like reference numerals refer to like parts previously described in FIG. 2. In this form the electrical conductor 26' is shown secured or cemented within aperture or recess 24 of lining 16 in a manner similar to that previously described. However, as shown in FIG. 4, the conductor 26' includes a relatively long angularly or obliquely extending end portion 48 which performs the same function as portions 44 of spring conductor 26. It is apparent that the recess 24 must extend in a circumferential direction of lining 16 sufficiently to accommodate the end portion 48 of the conductor 26'. From this configuration it is obvious that an axial force on the conductor 26' is resisted by the lateral surface of the oblique end portion 48 which is embedded within resinous cement material 50.

The electrical conductor 26 can be embedded in lining 16 at any point on the periphery thereof. However, it is most advantageous to locate the conductor at the point of most wear so that a more accurate determination of lining wear is obtained to prevent damage to the brake drum 2. Upon the occurrence of sufficient wear of lining 16, the end coil 46 of conductor 26 will engage the inner surface of drum 2 and complete a circuit through the brake light switch 30 to the signal light 34 which can be located on the dash to inform the vehicle operator that the linings are worn. The angular disposition of portions 44 result in the conductor 26 moving with the lining 16 as they both expand due to heat being generated when the brakes are applied. This assures that end coil 46 is in constant contact with drum 2 during application of the brakes so that the signal is continuously provided to the operator. The obliquely extending end portion 48 of conductor 26' shown in FIG. 4 accomplishes the same result in that the conductor is pulled along with the lining 16 to maintain end surface 52 of the conductor in engagement with drum 2. It is also significant that these described configurations of conductor 26 and 26' provide more surface contact area to be engaged by the resinous cement 27 and 50 so that the conductor is securely attached to the lining material.

It is readily apparent that this inventive arrangement provides a signalling apparatus wherein the electrical conductor is maintained in constant engagement with the brake drum to provide a completed circuit at all times during the application of the brakes. This feature being accomplished regardless of differences in coefficients of expansion of the material used in the conductor and the brake lining 16. Also in this arrangement the brake shoes can be slightly out of adjustment allowing linings 14 and 16 to lightly rub surface 18 of drum 2 without energizing light 34 as the latter is in series circuit with brake light switch 30.

While a preferred embodiment of the invention has been described for purposes of description only, it is not intended to limit the scope of this invention except as required by the following appended claims.

We claim:

1. A brake lining wear indicating apparatus including an electrically conductive brake drum electrically connected to ground, a brake shoe selectively actuated to a brake applying position, a brake lining mounted on said brake shoe and engaging said brake drum in the brake applying position, said brake lining being composed of an electrically insulated material, an electrical conductor having at least a portion thereof extending obliquely to and fixedly embedded in said brake lining, said conductor having a terminal end located at a predetermined depth in said brake lining, and circuit means including a source and an indicator connected to said conductor whereby the occurrence of a sufficient amount of brake lining wear results in said conductor terminal end contacting said brake drum thereby completing the circuit to said indicator, said oblique portion of said conductor presenting a surface sufficiently lateral to the direction of expansion of said brake lining and the direction of expansion of said conductor to insure movement of said terminal end with said lining whereby said conductor is maintained in electrical contact with said brake drum during application of the brakes.

2. A brake lining wear indicating apparatus including an electrically conductive brake drum electrically connected to ground, a brake shoe selectively actuated to a brake applying position, a brake lining mounted on said brake shoe and engaging said brake drum in the brake applying position, said brake lining having a specific radial thickness and being composed of an electrically insulated material, an electrically conductive coil spring including obliquely extending coil portions and terminating in a laterally disposed end coil being fixedly embedded in the brake lining, said laterally extending end coil being located at a predetermined depth in the radial thickness of said brake lining, and circuit means including a source and an indicator connected to said coil spring whereby the occurrence of sufficient brake lining wear results in said lateral end coil contacting said brake drum thereby completing the circuit to said indicator and said oblique spring portions presenting a surface sufficiently lateral to the direction of expansion of said brake lining and the direction of expansion of said coil spring to insure movement of said lateral coil with said lining regardless of the differences of coefficients of expansion between said coil and said lining so that said end coil is maintained in electrical contact with said brake drum during application of the brakes.

3. A brake lining wear indicating apparatus including an electrically conductive brake drum electrically connected to ground, a brake shoe selectively actuated to a brake applying position, a brake lining mounted on said brake shoe and engaging said brake drum in the brake applying position, said brake lining having a specific radial thickness and being composed of an electrically insulated material, a straight electrically conductive wire having an obliquely extending portion fixedly embedded in the brake lining, said oblique portion of the straight wire having a terminal end located at a predetermined depth in the radial thickness of said brake lining, and circuit means including an electrical source and an indicator connected to said straight conductive wire whereby the occurrence of a sufficient amount of brake lining wear results in said wire terminal end contacting said brake drum completing the circuit to said indicator, said oblique portion of said straight wire conductor presenting a surface sufficiently lateral to the direction of expansion of said brake lining and the direction of expansion of said straight wire to insure movement of said terminal end with said lining whereby said wire is positively maintained in electrical contact with said brake drum during application of the brakes.

References Cited
UNITED STATES PATENTS

| | | | |
|---|---|---|---|
| 2,217,176 | 10/1940 | Madison | 340—52 |
| 3,223,795 | 12/1965 | Yerman | 200—61.4 |
| 3,271,737 | 9/1966 | Bezemek | 340—52 |
| 3,398,246 | 8/1968 | Linet | 200—61.4 |
| 3,456,236 | 7/1969 | La Bartino | 340—52 |

THOMAS B. HABECKER, Primary Examiner

R. J. MOONEY, Assistant Examiner

U.S. Cl. X.R.

200—61.4